Sept. 29, 1942.  H. L. BOHNSTEDT  2,297,129
PRESSURE REGULATING VALVE
Filed Nov. 10, 1939   3 Sheets-Sheet 3

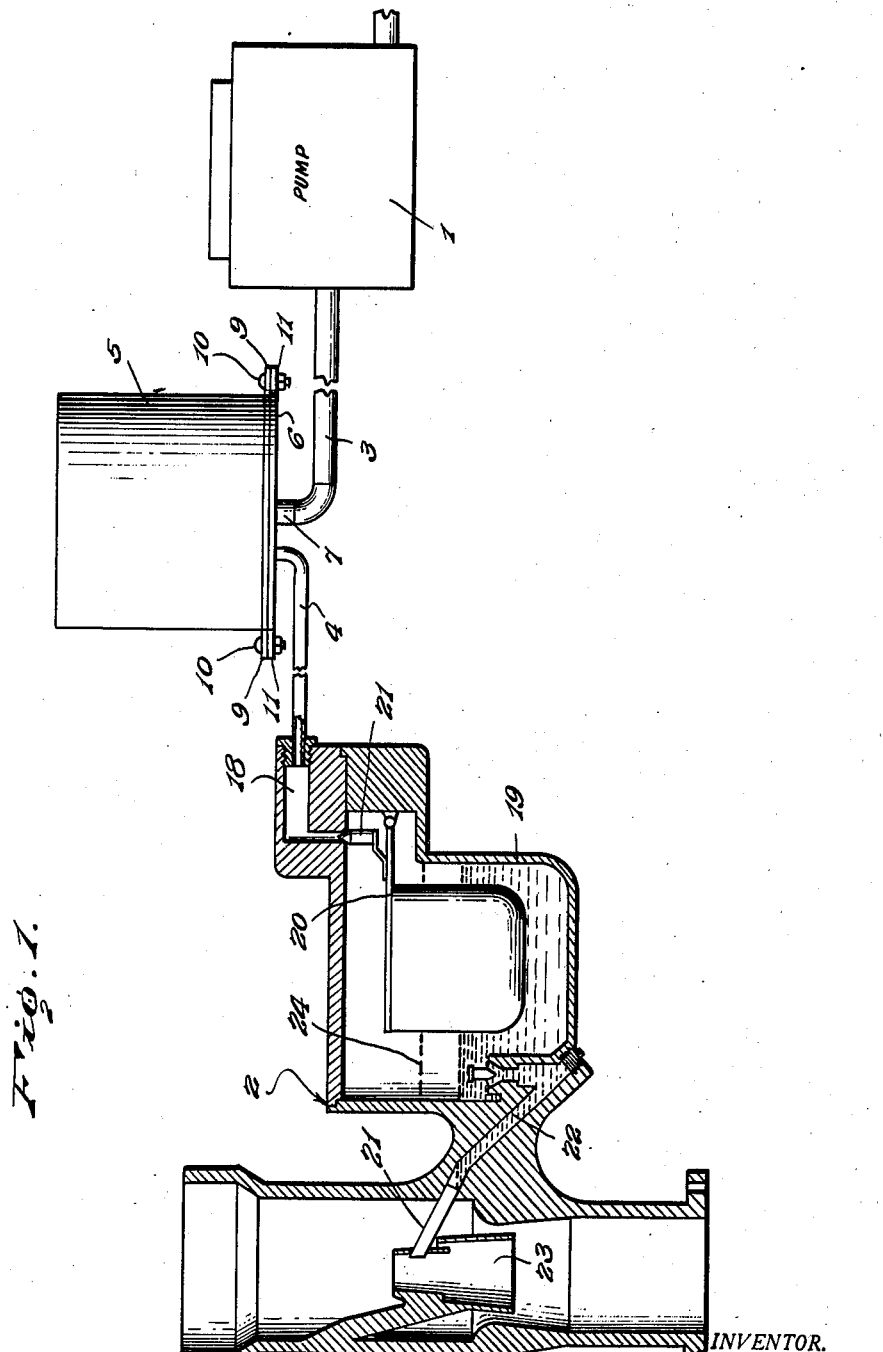

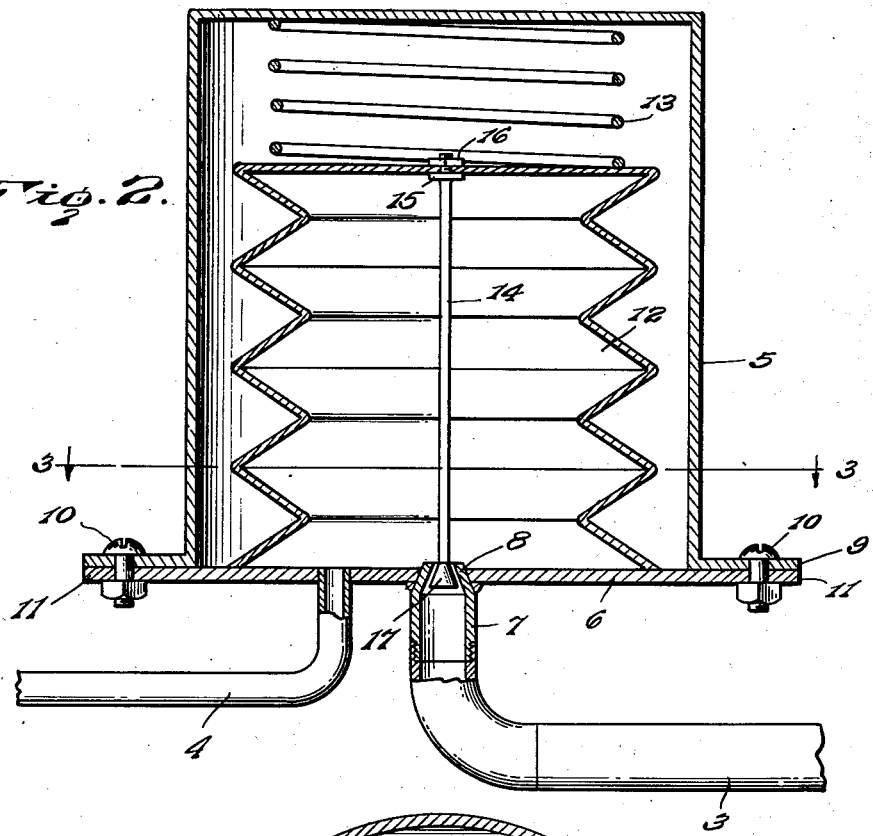
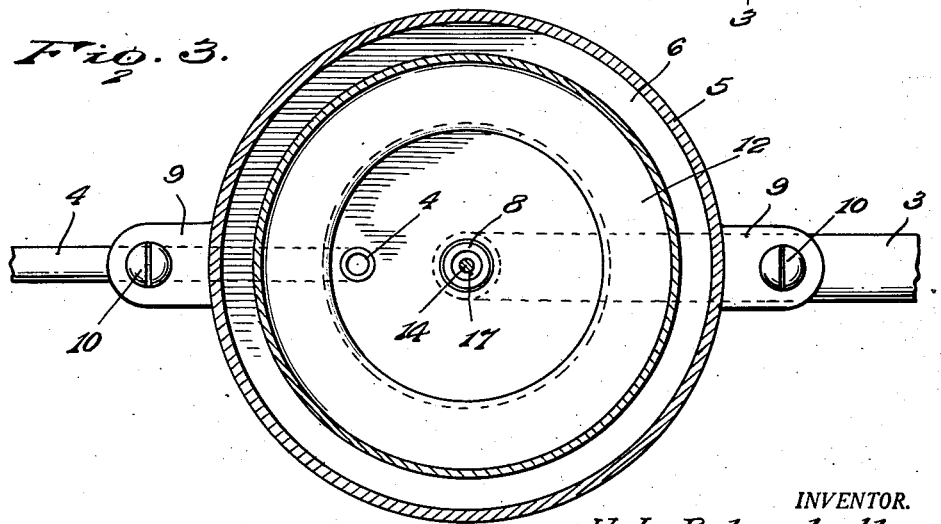

INVENTOR.
H. L. Bohnstedt.
BY
ATTORNEY

Patented Sept. 29, 1942

2,297,129

UNITED STATES PATENT OFFICE 2,297,129

PRESSURE REGULATING VALVE

Harry L. Bohnstedt, Custer, S. Dak.

Application November 10, 1939, Serial No. 303,864

1 Claim. (Cl. 50—23)

Pressure upon the gasoline or other liquid fuel fed to the carburetor of an internal combustion engine should be maintained substantially even at all times. Fuel is customarily delivered to the carburetor by a pump and during operation of the pump, pulsations are imparted to the fuel. This causes spasmodic movements to be imparted to the float valve mounted in the carburetor for controlling flow of fuel into the carburetor and, as the valve or its seat become worn, a tight seal is not formed and too much fuel will enter the carburetor. This causes flooding of the carburetor and incorrect fueling of the motor. It has also been found that suction through the intake manifold causes vibrations which tend to wear the valve and its seat and, after such wear, a normal pressure of three pounds from the pump will cause the fuel to flow too freely into the fuel bowl of the carburetor. If the pressure is reduced appreciably, engine suction under reduced vacuum in the intake manifold will not cause sufficient flow of fuel into the fuel bowl of the carburetor.

Therefore, one object of the invention is to provide a pressure controlling valve which, when mounted in the fuel line leading from the fuel pump to the carburetor, will maintain the fuel at substantially even pressure and cause an even flow of fuel to the carburetor without pulsations from the pump or impulses due to variations in engine suction. It will thus be seen that there will be an even flow of fuel during either high or low suction through the intake manifold of the engine and the fuel bowl will be kept filled to the proper level and wear on the float valve and its seat reduced to a minimum.

Another object of the invention is to so form the valve that pressure delivered thereby upon fuel flowing from the valve to the carburetor may be controlled and adjustments made to provide predetermined pressure.

Another object of the invention is to so form the valve that it may be easily installed in the fuel line of a motor and so disposed that it will be cooled by air currents from the cooling fan of the motor.

The invention is illustrated in the accompanying drawings, wherein:

Fig. 1 is a diagrammatic view showing a carburetor in vertical section and the fuel pump and improved valve in side elevation.

Fig. 2 is a sectional view on an enlarged scale, taken vertically through the improved valve.

Fig. 3 is a sectional view taken horizontally through the valve on the line 3—3 of Fig. 2.

Figure 4:
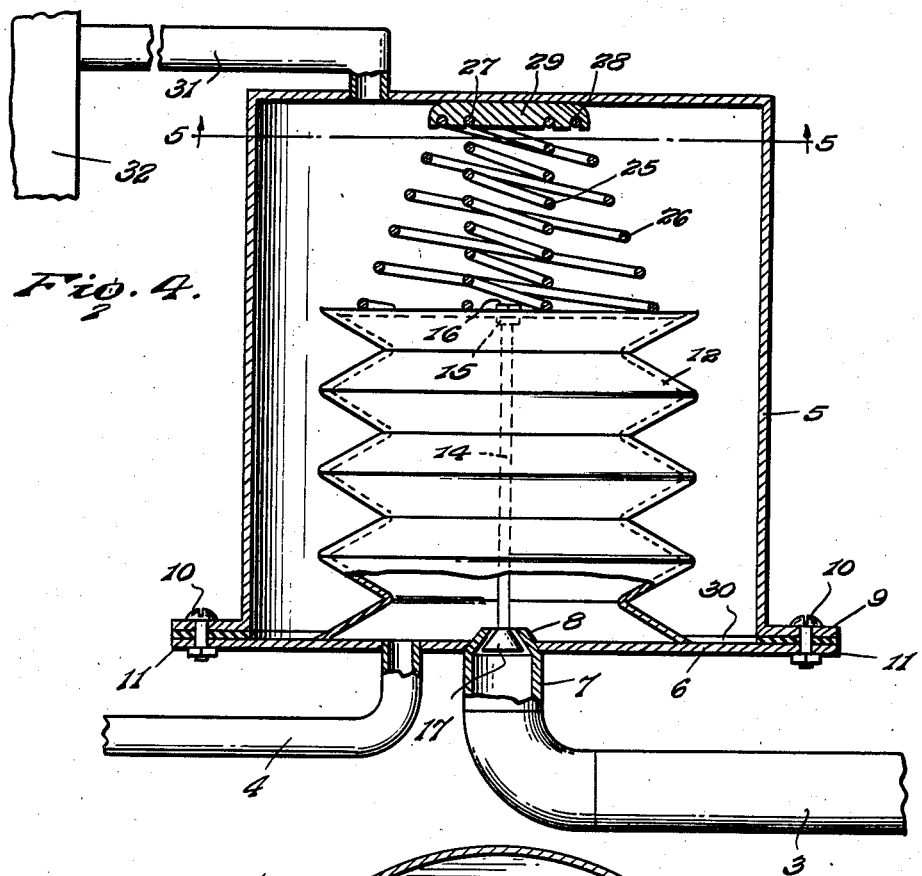
Fig. 4 is a sectional view taken vertically through a modified form of valve.
Figure 5:
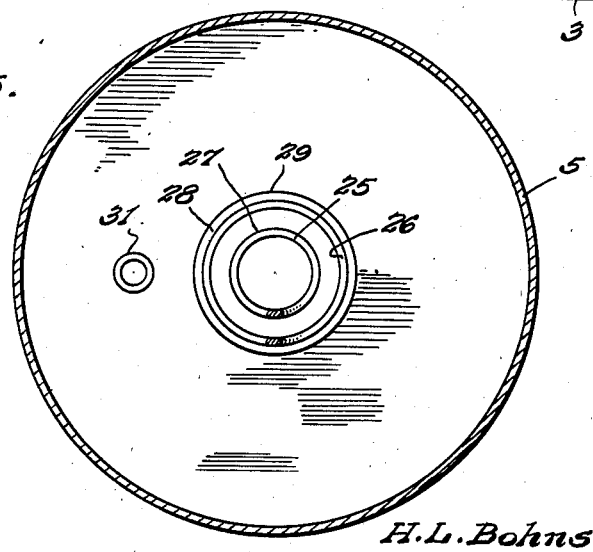
Fig. 5 is a sectional view taken horizontally through Fig. 4, on the line 5—5 thereof.

The improved valve is mounted in the fuel line between the fuel pump 1 and the carburetor 2, the valve being connected with the pump by a pipe or tube 3 which is of greater diameter than the pipe or tube 4 connecting the valve with the carburetor. These pipes or tubes enter the valve casing 5 through the bottom 6 thereof, the tube 3 having a nipple 7 terminating in a tapered end portion 8 defining a substantially conical valve seat. The casing is formed at its lower end with outstanding ears 9 through which bolts 10 are passed to firmly secure the casing to the companion ears 11 of the bottom 6 and hold the casing to the bottom. This permits easy removal of the casing from the bottom when access to mechanism within the casing is necessary.

Within the casing is located a bellows 12 disposed vertically and having its lower end united to the bottom by a sealed joint which will prevent gasoline from escaping into the casing. This bellows encloses the central portion of the bottom through which the nipple 7 and the upturned end of the tube pass and, in order to urge the bellows downwardly there has been provided a spring 13 confined under compression between the head of the bellows and the top of the casing. A valve stem 14 extends vertically in the bellows centrally thereof with its upper end extending through a central perforation in the bellows head, the bellows head being firmly gripped between the collar 15 and the nut 16 to hold the valve stem firmly centered with respect to the bellows. At its lower end, the valve stem carries a conical valve head 17 located within the tapered upper end portion 8 of the nipple 7. The valve head conforms to the taper of the tapered end portion or valve seat 8 of the nipple and, therefore, when the valve is shifted upwardly, it will have close fitting engagement with the valve seat and shut off flow of fuel into the bellows.

During use of the valve, it is installed in the fuel line between the fuel pump and the carburetor, the pipe section or tube 4 being secured in the inlet passage 18 of the carburetor. Flow of fuel into the bowl 19 of the carburetor is controlled by a float valve 20, the valve member 21 of which is held in closing relation to the inner end of the inlet passage when a predetermined quantity of fuel is in the bowl. The fuel jet 21 leads from the outlet passage 22 into the Venturi throat 23 and, as air is drawn through this throat by engine suction, fuel is mixed with the incoming air, to form a combustible mixture of the proper richness.

When the fuel pump has direct connection with the carburetor it has been found that the pressure of three pounds usually provided will have a tendency to unseat the float valve after an automobile has been in operation a few thousand miles and if the pressure is reduced an appreciable amount, proper flow of fuel to the carburetor will not take place when a low vacuum condition exists in the intake manifold of the engine. When a high vacuum condition exists and pressure is at three pounds, the pump has a tendency to impart impulses to the gasoline and unseat the float valve and the level of fuel in the bowl will be raised from normal, as shown in Fig. 1, to the level indicated by the line 24 and the carburetor will be flooded, thus causing too much fuel to be delivered into the venturi 23.

By use of the improved valve in the fuel line, flooding of the carburetor is avoided. Referring to Fig. 2, it will be seen that the fuel passes from the pump through pipe 3 and nipple 7 into the bellows and, as the bellows fill, the bellows will be expanded, thus compressing the spring 13 and causing this spring to urge the bellows downwardly. If the fuel raises the bellows to a predetermined extent, the valve head 17 will be shifted upwardly to such a position that it will seat against the valve seat 8 and flow of fuel into the bellows will be stopped. Action of the spring 13 will then force the fuel out of the bellows through pipe 4 to the carburetor at a steady flow and at such pressure that the float valve will not be unseated. It will thus be seen that the fuel will flow in a steady stream instead of pulsating and the float valve will properly control flow of fuel into the fuel bowl 19. As soon as the spring 13 has depressed the bellows sufficiently to move the valve head out of engagement with the valve seat, fuel may again enter the bellows. Since the fuel has an opportunity to spread out in the bellows before entering pipe 4, pulsations caused by the pump will be dissipated and a steady flow of fuel will be assured through pipe 4 to the carburetor. A controlled pressure will thus be provided for the liquid fuel flowing through pipe 4 to the carburetor and flooding of the carburetor will not occur.

Instead of using a single spring, as shown in Fig. 2, two springs 25 and 26 may be employed, as shown in Fig. 4. These springs are in concentric relation to each other and have their lower ends resting on the head of the bellows and their upper ends engaged in annular grooves or seats 27 and 28 formed in the under face of a thick metal disk 29 secured in any desired manner against the inner face of the top wall of the casing 5 centrally thereof. The two springs evenly distribute pressure on the head of the bellows and maintain the same level. It should also be noted that in Fig. 4, the joint between the casing 5 and the bottom 6 is sealed by a gasket 30 and a pipe or tube 31 extends from the top of the casing for connection with the intake manifold 32 of the engine. Therefore, a vacuum condition will be created within the casing when the engine is running and the ease with which the bellows may be shifted upwardly in opposite to action of the springs and move the valve head 17 to closed position will be varied according to the engine speed and the amount of suction created thereby through the tube 31 from the intake manifold.

Having thus described the invention, what is claimed is:

A pressure regulating valve of the character described comprising a casing having a head at its upper end and an outstanding flange about its lower end, a bottom for said casing, bolts passing through the flange and marginal portions of the bottom to removably secure the bottom to the casing, the bottom being provided with a fuel inlet opening at its center and a fuel outlet spaced laterally therefrom, a coupling for a fuel pipe having its upper portion tapered upwardly and mounted through the inlet opening and constituting a valve seat, a bellows in said casing having its lower end sealed to the bottom thereof in spaced relation to walls of the casing and in enclosing relation to the inlet and the outlet and defining an expansible fuel chamber within the casing surrounded by an outer chamber, a spring seat mounted against the under face of the top of the casing over the bellows axially thereof and having inner and outer concentric grooves in its under face, a helical spring in said casing between the bellows and the spring seat having its lower end resting upon the bellows and its upper end seated in the inner groove, a second helical spring surrounding the first spring in spaced relation thereto and tapered upwardly and having its lower end resting upon the bellows and its upper end seated in the outer groove, said springs cooperating with each other to apply downward pressure on the bellows and evenly distribute pressure thereon, a valve stem extending vertically through the bellows axially thereof with its upper end secured through the head of the bellows centrally thereof and its lower end extending into the coupling through the tapered upper end thereof, and a valve head carried by the lower end of the valve stem within the coupling and tapered upwardly to conform to and seat tightly against the valve seat and close the upper end of the coupling when shifted upwardly by expansion of the bellows.

HARRY L. BOHNSTEDT.